US012647032B2

(12) United States Patent
Yu et al.

(10) Patent No.: US 12,647,032 B2
(45) Date of Patent: Jun. 2, 2026

(54) FAST-RESPONSE SWITCH POWER SUPPLY CONTROL CIRCUIT AND CONTROL METHOD THEREOF

(71) Applicant: Joulwatt Technology Co., Ltd., Hangzhou (CN)

(72) Inventors: Yangwei Yu, Hangzhou (CN); Aimim Xu, Hangzhou (CN); Xunjin Dou, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 248 days.

(21) Appl. No.: 18/341,923

(22) Filed: Jun. 27, 2023

(65) Prior Publication Data

US 2023/0421062 A1 Dec. 28, 2023

(30) Foreign Application Priority Data

Jun. 27, 2022 (CN) .......................... 202210743142.1

(51) Int. Cl.
H02M 3/158 (2006.01)
H02M 1/00 (2007.01)

(52) U.S. Cl.
CPC ......... H02M 3/158 (2013.01); H02M 1/0009 (2021.05); H02M 1/0025 (2021.05)

(58) Field of Classification Search
CPC .... H02M 3/158; H02M 3/156; H02M 3/1588; H02M 3/1566; H02M 1/0025
See application file for complete search history.

(56) References Cited

U.S. PATENT DOCUMENTS

| | | | | |
|---|---|---|---|---|
| 6,377,032 B1 * | 4/2002 | Andruzzi | ............ | H02M 3/1588 |
| | | | | 323/224 |
| 9,780,662 B1 * | 10/2017 | Milanesi | ................ | H02M 3/156 |
| 11,095,221 B1 * | 8/2021 | Hsu | ........................ | H02M 3/158 |
| 2002/0125872 A1 * | 9/2002 | Groom | .................. | H02M 3/156 |
| | | | | 323/288 |
| 2011/0037448 A1 * | 2/2011 | Liu | ........................ | H02M 3/158 |
| | | | | 323/284 |
| 2014/0159689 A1 * | 6/2014 | Chen | ...................... | H02M 3/156 |
| | | | | 323/282 |
| 2015/0069982 A1 * | 3/2015 | Ouyang | ................ | H02M 3/156 |
| | | | | 323/234 |

(Continued)

FOREIGN PATENT DOCUMENTS

| | | | | | |
|---|---|---|---|---|---|
| CN | 115706506 A | * | 2/2023 | ............ | H02M 3/158 |

*Primary Examiner* — Gustavo A Rosario-Benitez
(74) *Attorney, Agent, or Firm* — Treasure IP Group, LLC

(57) ABSTRACT

The present application discloses a fast-response switch power supply control circuit and a control method thereof. A triangular wave signal associated with inductor current information is obtained by a triangular wave generation circuit; the triangular wave signal is calculated with an error compensation signal by the capacitor circuit to obtain a first compensation signal; a comparator compares the first compensation signal with an output voltage feedback signal to obtain a comparison result to control the turning-on of the power switch transistor. The present application has the beneficial effects of good loop stability and fast dynamic response of the system without requiring a sampling circuit to sample the inductor current information in the case of using a relatively simple circuit.

13 Claims, 7 Drawing Sheets

(56) References Cited

U.S. PATENT DOCUMENTS

| | | | |
|---|---|---|---|
| 2015/0222181 A1* | 8/2015 | Coleman | H02M 3/156 323/288 |
| 2016/0164412 A1* | 6/2016 | Li | G01R 31/40 323/299 |
| 2017/0070148 A1* | 3/2017 | Yuan | H02M 1/12 |
| 2018/0145593 A1* | 5/2018 | Xi | H02M 3/156 |
| 2022/0158537 A1* | 5/2022 | Xie | H02M 1/08 |
| 2023/0238883 A1* | 7/2023 | Hsieh | H02M 3/158 323/282 |
| 2023/0299674 A1* | 9/2023 | Liu | H02M 3/06 323/271 |
| 2024/0380321 A1* | 11/2024 | Lalithambika | H02M 3/1566 |

\* cited by examiner

1

FAST-RESPONSE SWITCH POWER SUPPLY CONTROL CIRCUIT AND CONTROL METHOD THEREOF

CROSS-REFERENCE TO RELATED APPLICATION

This application claims priority to Chinese patent application No. 202210743142.1, filed on Jun. 27, 2022, published as CN115706506A on Feb. 17, 2023, and entitled "FAST-RESPONSE SWITCH POWER SUPPLY CONTROL CIRCUIT AND CONTROL METHOD THEREOF", the entire content of which is incorporated by reference.

FIELD OF THE DISCLOSURE

The present invention relates to the technical field of power electronics, and more particularly, to a fast-response switch power supply control circuit and a control method thereof.

DESCRIPTION OF THE RELATED ART

The switch power supply converts the input voltage into the desired output voltage through the conversion of its power switch transistor. During the working process of the switch power supply, when the load at the output terminal changes, the output voltage is easy to jump. At this time, it needs the control loop of the switch power supply circuit to timely respond to the load change at the output terminal, which can quickly adjust the working state of the power switch transistor to maintain the stability of the output voltage as much as possible.

In the prior art, the control circuit of the switch power supply obtains the error compensation signal by performing error application on the output voltage feedback signal and the reference signal, and obtains the sampling signal by sampling the inductor current with a sampling circuit like a sampling resistor, and compares the sampling signal with the error compensation signal to obtain the control signal to control the turning-on of the power switch transistor; this manner can rapidly respond to the load change information of the output terminal; however, this manner needs to output the sampling signal to sample the inductor current, and the circuit is complex and with big consumption. It needs a simple circuit to realize the control manner of fast and dynamic response.

SUMMARY OF THE DISCLOSURE

In view of this, the objective of the present invention is provide a fast-response switch power supply control circuit and a control method thereof, to solve the complex technical problem in the prior art of realizing that the switch power supply responds the circuit rapidly.

The present application proposes a fast-response switch power supply control circuit, and the switch power supply comprises a main power transistor, a freewheeling transistor, and an inductor which are connected, wherein the control circuit comprises an error compensation circuit obtaining an error compensation signal according to an output voltage feedback signal and a reference signal; a triangle wave generation circuit, which obtains a triangular wave signal according to the switch signal information of the main power transistor, the triangular wave signal representing current information of the inductor, and the triangular wave signal is superimposed with the output voltage feedback signal or the error compensation by a capacitor circuit, a comparison circuit, which compares the error compensation signal with the superimposed signal of the triangular wave signal and the output voltage feedback signal, or compares the output voltage feedback signal with the superimposed signal of the triangular wave signal and error compensation signal, Preferably, the absolute value of slope of the triangular wave signal is proportional to the absolute value of slope of the inductor current.

Preferably, the triangle wave generation circuit comprises a charging and discharge circuit and a capacitor circuit; a first terminal of the capacitor circuit is connected to the output voltage terminal of the switch power supply or the signal output terminal of the error compensation signal, and a second terminal is connected to the charging and discharging circuit, the charging and discharging circuit controls the charging and discharging of the capacitor circuit according to the switch signal information of the main power transistor, the second terminal voltage signal of the capacitor circuit is used as the triangle wave signal.

Preferably, the capacitor circuit comprises a first capacitor and a second capacitor which are connected, and a common node of the first capacitor and the second capacitor is connected to the output voltage terminal of the switch power supply or the signal output terminal of the error compensation signal; the triangle wave signal is superimposed with the output voltage feedback signal or the error compensation signal after being voltage-divided by the first capacitor and the second capacitor.

Preferably, the triangular wave signal performs a superposition operation on the error compensation signal to obtain a first compensation signal, and the comparison circuit compares the output voltage feedback signal with the first compensation signal.

Preferably, the change trend of the first compensation signal is opposite to that of the inductor current.

Preferably, the charging and discharging circuit comprises a first resistor, a first switch, and a first current source, a first terminal of the first capacitor is connected to the output terminal of the error amplifier, a second terminal is connected to the reference potential terminal; a first terminal of the second capacitor is connected to the output terminal of the error amplifier, and a second terminal is connected to the charging and discharging circuit; a first terminal of the first resistor receives first power supply voltage, and a second terminal is connected to the second terminal of the second capacitor; the first switch and the first current source are connected in series, one terminal of the series branch is connected to the second terminal of the second capacitor, and the other terminal is connected to the fixed potential terminal, wherein the first switch controls its turning-on and -off according to the switch signal information of the main power transistor, and the current of the first current source flows to the fixed potential terminal.

Preferably, the charging and discharging circuit comprises a first switch and a first current source, a first terminal of the first capacitor is connected to an output terminal of the error amplifier, a second terminal is connected to a reference potential terminal; a first terminal of the second capacitor is connected to the output terminal of the error amplifier, and the second terminal is connected to the charging and discharging circuit; a first current source is connected to the second terminal of the second capacitor, and the current of the first current source flows to the second terminal of the second capacitor, the first switch is connected between the second terminal of the second capacitor and the fixed potential terminal, and the first switch controls the turning-on and -off of the main power transistor according to the switch signal information.

Preferably, the current value of the first current source is proportional to the input voltage and/or output voltage of the switch power supply.

Preferably, the first capacitor is multiplexed with a compensation capacitor in the error compensation circuit.

Preferably, the triangular wave signal performs a superposition operation on the output voltage feedback signal to obtain a first compensation signal, and the comparison circuit compares the error compensation signal with the first compensation signal; and the change trend of the first compensation signal is the same as that of the inductor current.

Preferably, the charging and discharging circuit comprises a second resistor, a second switch, and a second current source; a first terminal of the second capacitor is connected to a signal end of the output voltage feedback signal, a second terminal is connected to the charging and discharging circuit; a first terminal of the first capacitor is connected to the output terminal of the switch power supply, and a second terminal is connected to a second terminal of the second capacitor; the first switch and the first current source are connected in series, one terminal of the series branch is connected to the second terminal of the first capacitor, and the other terminal is connected to the fixed potential terminal, wherein the first switch controls the turning-on and -off of the main power transistor according to the switch signal information, and the current of the first current source flows to the second terminal of the second capacitor.

Preferably, the current value of the second current source is proportional to the input voltage and/or output voltage of the switch power supply.

Preferably, the control circuit further comprises a turning-on time control circuit, and the turning-on time control circuit is used to control the turning-on time of the main power transistor, and outputs a turning-off signal to control the main power transistor to turn off.

Preferably, the main power transistor, the freewheeling transistor, and the inductor constitute a power stage circuit, and the switch power supply comprises a multi-phase power stage circuit, the triangular wave generating circuit obtains a triangular wave signal according to the switch signal information of the main power transistor of each phase in the multi-phase power stage circuit, and the triangular wave signal represents the current information of the inductor in the power stage circuit of each phase.

In the second aspect, the present application discloses a fast-response switch power supply control method, the switch power supply comprising a main power transistor, a freewheeling transistor, and an inductor which are connected, wherein comprising: obtaining an error compensation signal according to an output voltage feedback signal and a reference signal; obtaining a triangular wave signal according to the switch signal information of the main power transistor, the triangular wave signal representing the current information of the inductor, and the triangular wave signal is superimposed with the error compensation signal through a capacitor circuit to obtain a first compensation signal, comparing the output voltage feedback signal with the first compensation signal to obtain a turning-on signal for controlling the turning-on of the main power transistor.

Preferably, an absolute value of the slope of the triangular wave signal is proportional to the absolute value of the slope of the inductor current.

Preferably, the change trend of the first compensation signal is opposite to that of the inductor current.

Preferably, controlling the charging and discharging of the capacitor circuit according to the switch signal information of the main power transistor to obtain the triangular wave signal; the capacitor circuit comprises a first capacitor and a second capacitor which are connected; the triangular wave signal is superimposed with the error compensation signal after being voltage-divided by the first capacitor and the second capacitor.

In the third aspect, it is disclosed a fast-response switch power supply control method, wherein the switch power supply comprises a main power transistor, a freewheeling transistor, and an inductor which are connected, wherein comprising: obtaining an error compensation signal according to the output voltage feedback signal and the reference signal; obtaining a triangular wave signal according to the switch signal information of the main power transistor, the triangular wave signal representing the current information of the inductor, and the triangle wave signal is superimposed with the output voltage feedback signal through a capacitor circuit to obtain a first compensation signal, comparing the error compensation signal with the first compensation signal to obtain a turning-on signal for controlling the turning-on of the main power transistor.

Preferably, an absolute value of the slope of the triangular wave signal is proportional to the absolute value of the slope of the inductor current.

Preferably, the change trend of the first compensation signal is the same as that of the inductor current.

Preferably, controlling the charging and discharging of the capacitor circuit according to the switch signal information of the main power transistor to obtain the triangular wave signal, the capacitor circuit comprises a first capacitor and a second capacitor connected in series; the triangular wave signal is superimposed with the error compensation signal after being voltage-divided by the capacitor and the second capacitor.

By using the circuit structure of the present disclosure, triangle wave signals associated with the inductor current information are obtained by the triangle wave generation circuit, and the triangle wave signal is superimposed with the error compensation signal to obtain the first compensation signal; the comparator compares the first compensation signal with the output voltage feedback signal, so as to control the turning-on and -off of the power switch transistor according to the comparison result. By the above control manner, when the output load of the switch power supply changes by the information of the output voltage feedback signal, it may control the loop to timely respond to adjust the output voltage, and it may obtain triangle wave signals associated with the inductor current by the triangle wave generation circuit to ensure the stability of the circuit control; the present application considers loop stability of the system and the advantageous effects of dynamic and fast response; moreover, this application does not need a circuit, and the circuit structure is simple.

DETAILED DESCRIPTION OF EMBODIMENTS OF THE DISCLOSURE

The following will describe in great detail the preferred embodiments of the present invention by combining with the accompanying drawings. However, the present invention is not restricted to these embodiments. The present invention covers any replacement, amendments, equivalent methods and solutions made within the scope and spirits of the present invention.

In order to make the public to have a thorough understanding of the present invention, details are provided in the following detailed description of the preferred embodiments of the present invention; however, those skilled in the art can totally understand the present invention without the descriptions of these details.

The present invention will be described in more details by way of illustration by referring to the accompanying drawings in the following paragraphs. It needs to explain that the accompanying drawings all use simplified forms and use non-accurate ratios, and are merely for helping to illustrate the embodiments of the present invention conveniently and clearly.

Figure 1:
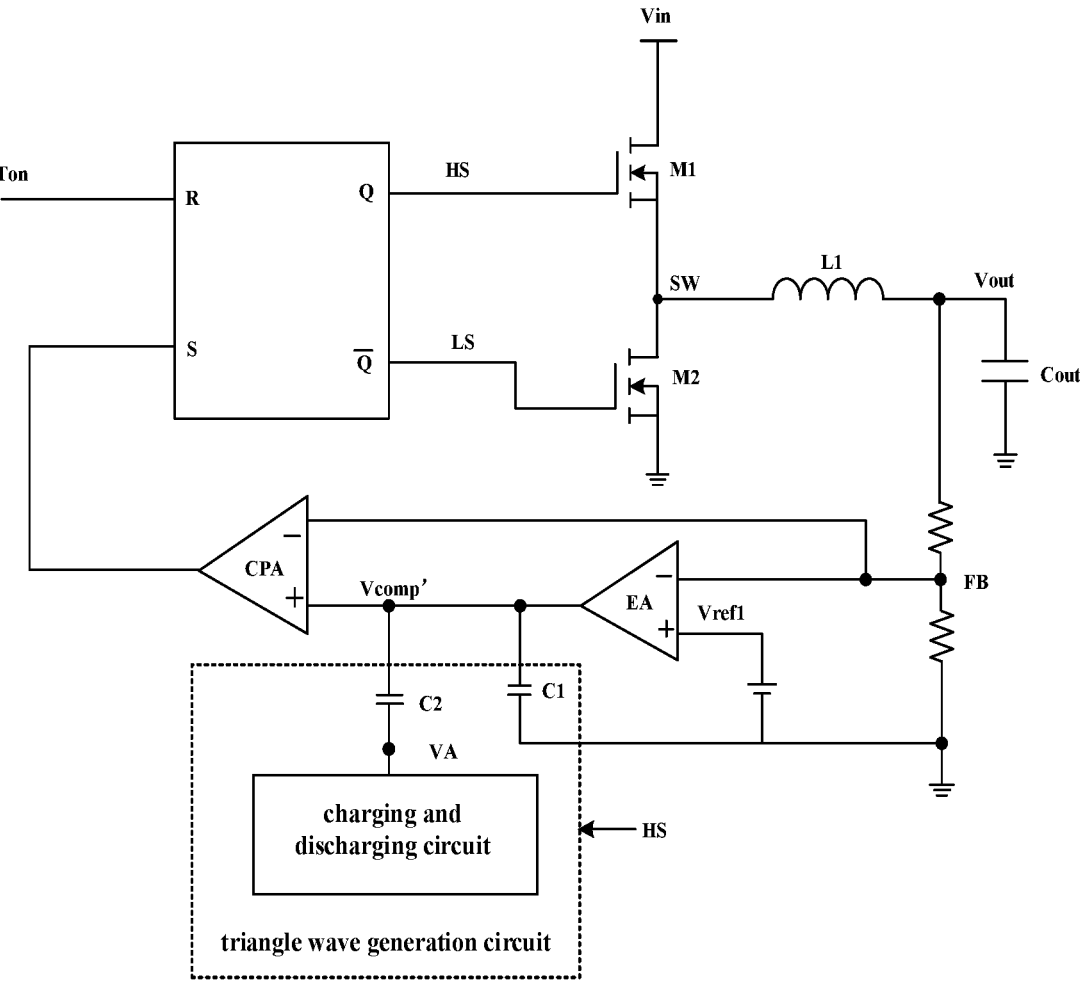
FIG. 1 is a block diagram of the switch power supply control circuit according to the present invention.
Figure 2:
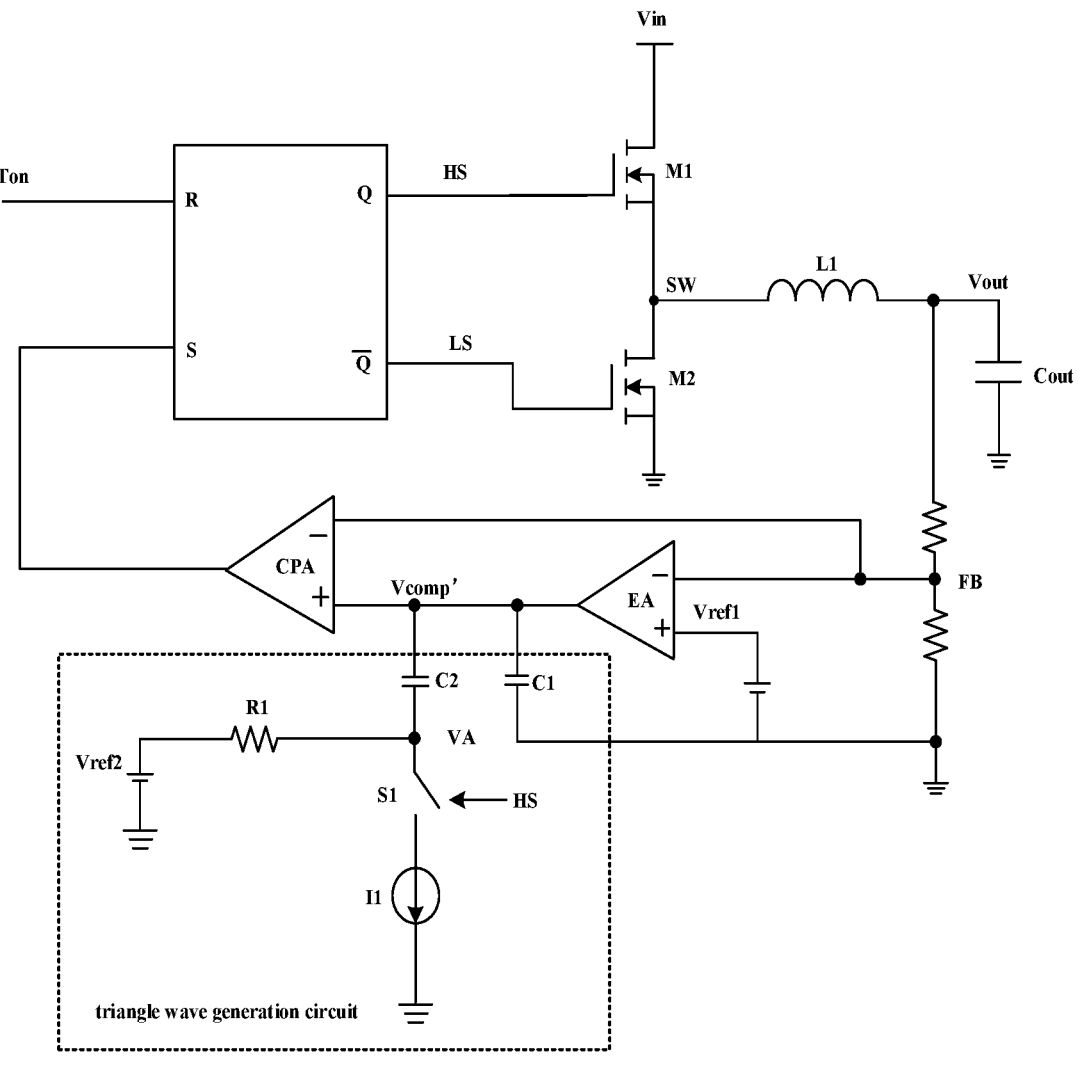
FIG. 2 is a circuit diagram of the first embodiment of the triangle wave generation circuit according to the present invention.
Figure 4:
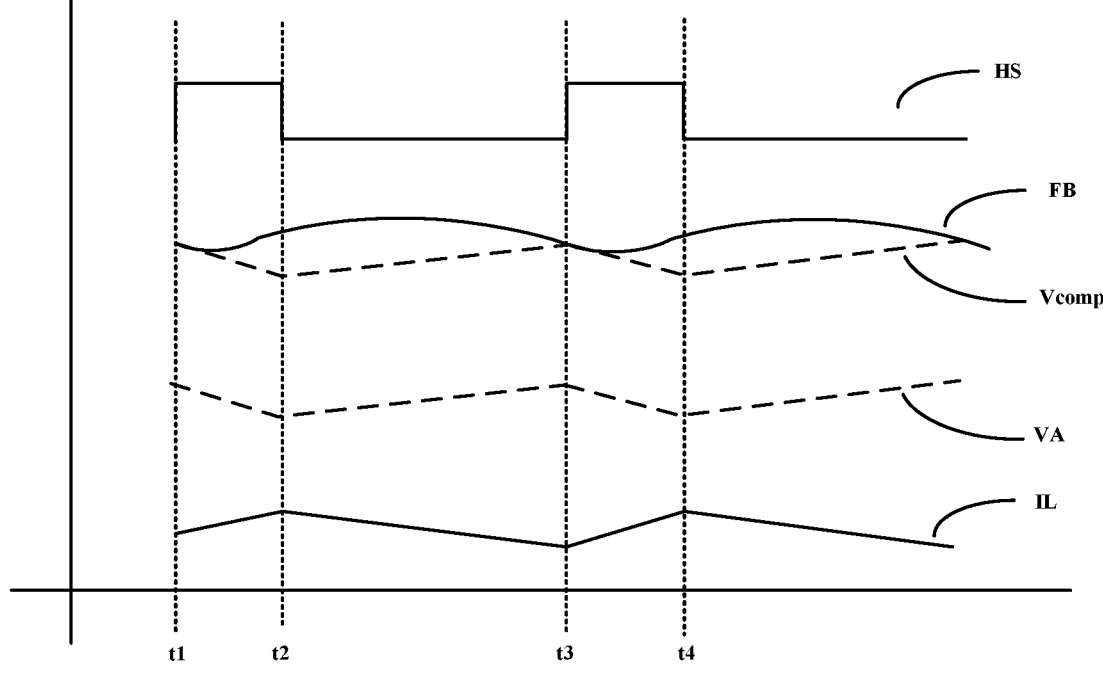
FIG. 4 is a working waveform of the first embodiment according to the present invention.

FIG. 1 is a block diagram of the switch power supply control circuit according to the present invention; FIG. 2 is a circuit diagram of the first embodiment of the triangle wave generation circuit according to the present invention, and FIG. 4 is a working waveform of the first embodiment according to the present invention. The control circuit of the present invention is applied in a switch power supply, and the switch power supply comprises a main power transistor, a freewheeling transistor, and an inductor which are connected, and the main power transistor, the freewheeling transistor, and the inductor can form topology structures like Buck, Boost, Buck-Boost; the embodiment of the present application takes Buck as an example, e.g., it comprises a main power transistor M1, a freewheeling transistor M2, and an inductor L1; refer to FIG. 1, the control circuit comprises an error compensation circuit, a triangle wave generation circuit, a comparison circuit, and a logic circuit; the error compensation circuit receives the output voltage feedback signal FB and a reference signal Vref1, to perform error amplification to obtain an error compensation signal Vcomp; the triangular wave generation circuit obtains a triangular wave signal $V_A$ according to the switch signal information of the main power transistor, which represents the current information of the inductance; the triangular wave signal $V_A$ is superimposed with the output voltage feedback signal or the error compensation signal through a capacitor circuit. In the example shown in FIG. 1, the capacitor circuit includes the connected capacitor C2 and capacitor C1. Specifically, capacitors C2 and C1 are connected in series, as shown in FIG. 1, the superimposed signal is recorded as the first compensation signal Vcomp'; after that, the comparison circuit compares the feedback signal of the output voltage with the superimposed error compensation signal; the output terminal of the logical circuit is connected with the output terminal of the comparison circuit to obtain a turning-on signal to control the main power transistor to turn on according to the comparison result.

Schematically, refer to FIG. 1 and FIG. 2, the triangular wave generation circuit comprises a charging and discharge circuit and a capacitor circuit. The first terminal of the capacitor circuit is connected with the signal output terminal of the error compensation signal, and the second terminal is connected with the charging and discharging circuit; the charging and discharging circuit controls the charging and discharging of the capacitor circuit according to the switch signal information of the main power transistor, and the voltage signal of the second terminal of the capacitor circuit is used as the triangle wave signal $V_A$. Here, the common node of the first capacitor and the second capacitor is connected to the signal output terminal of the error compensation signal, and the triangle wave signal performs superposition with the error compensation signal after the triangle wave signal is voltage-divided by the first capacitor and the second capacitor.

Continue to refer to FIG. 2, the charging and discharge circuit comprises a first resistance R1, a first switch S1, and a first current source I1. The first terminal of the first capacitor C1 is connected to the output terminal of the error amplifier, and the second terminal is connected to the reference potential terminal; the first terminal of the second capacitor C2 is connected to the output terminal of the error amplifier, and the second terminal is connected to the charging and discharging circuit; the first terminal of the first resistor R1 receive the first power supply voltage Vref2, and the second terminal is connected to the second terminal of the second capacitor; the first switch S1 and the first current source I1 are connected in series; one terminal of the series branch is connected the second terminal of the second capacitor, and the other terminal is connected to the fixed potential terminal; wherein, the first switch controls the turning-on and -off of according to the switch signal HS of the main power transistor, and the current of the first current source flows to the fixed potential terminal. Here, the switch status of the first switch and the main power transistor is the same. The fixed potential terminal and the reference potential terminal are the reference ground terminal, but it can also be the potential terminal with a certain voltage value.

The following will illustrate the working principle of the present application by combining with the waveform shown in FIG. 4; when the first switch is turned on, after stable work, the voltage formula of the triangle wave signal $V_A$ is as follows, wherein D is a duty cycle, $$V_A = Vref2 - I1 * D * R1$$

When the first switch is turned on, the current flowing to the capacitor is $I1 * D - I1 = I1 * (D-1)$.

According to the property of the capacitor, there is $C * (du/dt) = I1 * (D-1)$.

For the inductor current, $L * di/dt = Vin - Vout = Vin * (1-D)$

Here, a ratio of the change rate of the capacitor voltage and the inductor current is $-L * I1/(Vin * C)$.

When the first switch is turned off, the current flowing to the capacitor is $I1 * D$, the capacitor voltage is $C * (du/dt) = I1 * D$, and the inductor current is $L * di/dt = -Vout = -Vin * D$.

Here, a ratio of the change rate of the inductor voltage and the inductor current is $-L * I1/(Vin * C)$.

Therefore, in the two states, the voltage ripples of the capacitor are both in inverse proportional to the inductance current. The positive and negative signs in the formula are related to the direction of the current, and here the current is defined as a positive direction.

In this example, the triangular wave signal is opposite to the change trend of the inductor current. The first compensation signal is the superposition of the capacitance-divided signal and the error compensation signal of the triangular wave signal. The waveforms of the first compensation signal and the triangle wave signal are consistent and with different size, so the change trend of the first compensation signal is also opposite to that of the inductor current. As shown in FIG. 4, IL is an inductive current wave shape, HS is the turning-on signal of the main power transistor, VA is a triangular wave signal, and Vcomp' is the first compensation signal. The main power transistor is turned on when the feedback signal FB achieves the first compensation signal, e.g., time t3.

The control circuit also comprises a turning-on time control circuit. The turning-on time control circuit is used to control the turning-on time of the main power transistor. The turning-on time control circuit can be the existing appropriate time calculation circuit, such as a clock circuit, etc., which is not shown in the figure.

Schematically, the first capacitor C1 and the compensation capacitor in the error compensation circuit can be multiplexed. For example, in this example, the first capacitor can be used either as a compensation capacitor in the error compensation circuit, or as a voltage-dividing capacitor in the capacitor circuit. In this way, it can save components in the circuit and reduce system costs.

Schematically, the current value of the first current source I1 is in positive proportion to the input voltage and/or output voltage of the switch power supply. Since the voltage of point A is VA=Vref2-D*R1*I1, wherein D1 is a duty cycle of the main switching transistor. If I1 is in positive proportion to the input voltage Vin, then VA=Vref2-D*R1*Vin*gm=Vref2-(Vout/Vin) *R1*Vin*gm=Vref2-Vout*R1*gm. In this way, the voltage of point A is not related to the input voltage. When the input voltage changes, the triangular wave signal is not affected and the output stability is good. When the topology of the switch power supply is boost, the size of the current source can be set to the proportional relationship with the output voltage, and the voltage at point A is not affected by the output voltage.

The embodiment of the present application, by obtaining the triangle wave signal related to the inductor current by the charging and discharging of the triangle wave generation circuit, and then superimposing the triangle wave signal tin to the loop for control, can realize the stability of controlling the loop. The present application does not need to sample the inductor current information, and the circuit is simple. Moreover, the present application makes the output feedback voltage FB to directly participate into the loop control, and the dynamic response of the system is fast. The present application superimposes the triangle wave signal to the control loop by the capacitor circuit, and the capacitor has the characteristics of DC communication; thus, it only allows the AC signal denoting the inductor current information to pass, and isolates voltage of DC signals, such Vref2, which can greatly reduce signal interference, and increase system accuracy and stability.

Figure 3:
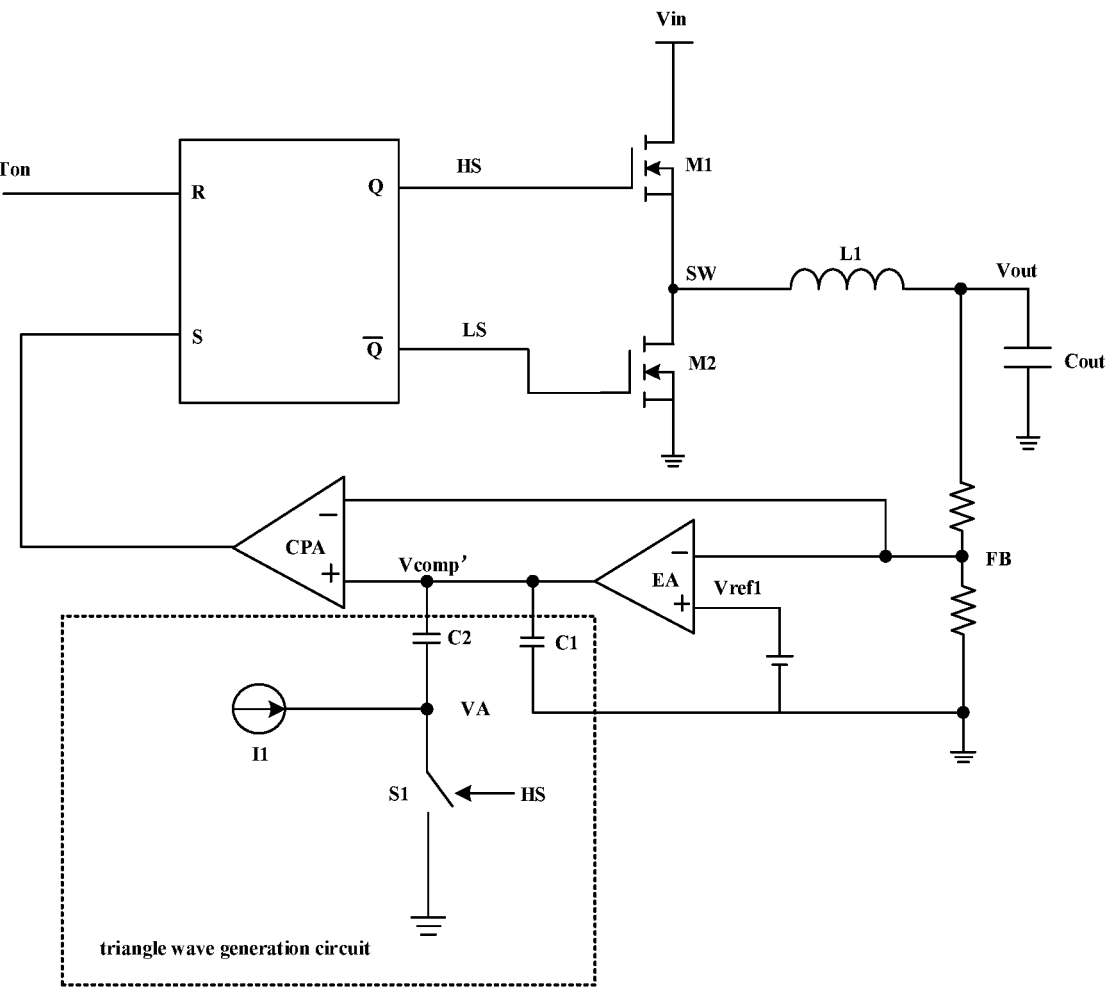
FIG. 3 is a circuit diagram of the second embodiment of the triangle wave generation circuit according to the present invention.

Refer to FIG. 3, it is a circuit diagram of the second diagram according to the triangle wave generation circuit of the present invention. This application differs from the previous embodiment in the charging and discharging circuit, which comprises the first switch S1 and the first current source i1. The connection method of the capacitor circuit is the same as the previous embodiment. The first terminal of the first capacitor is connected to the output terminal of the error amplification, and the second terminal is connected to the potential terminal; the first terminal of the second capacitor is connected to the output terminal of the error amplification, and the second terminal is connected to the charging and discharging circuit; the first current source is connected to the second terminal of the second capacitor, and the current of the first current source flows to the second terminal of the second capacitor; the first switch is connected between the second terminal of the second capacitor and the fixed potential terminal, and the first switch controls the turning-on and -off of the main power transistor according to its switch signal information. In this embodiment, when the first switch S1 is turned on, voltage $V_A$ is pulled to the reference ground potential; thus, according to the working principle and the wave form of the previous embodiment, the triangle wave signal in this embodiment denotes the information during the declining process of the inductor current, and its slope is in proportion to the absolute value of the declining slope of the inductor current. In some occasions that require applications, loop control can also be made by merely using the drop information of the inductor current, to get the beneficial effects of good stability and dynamic and fast response.

Figure 6:
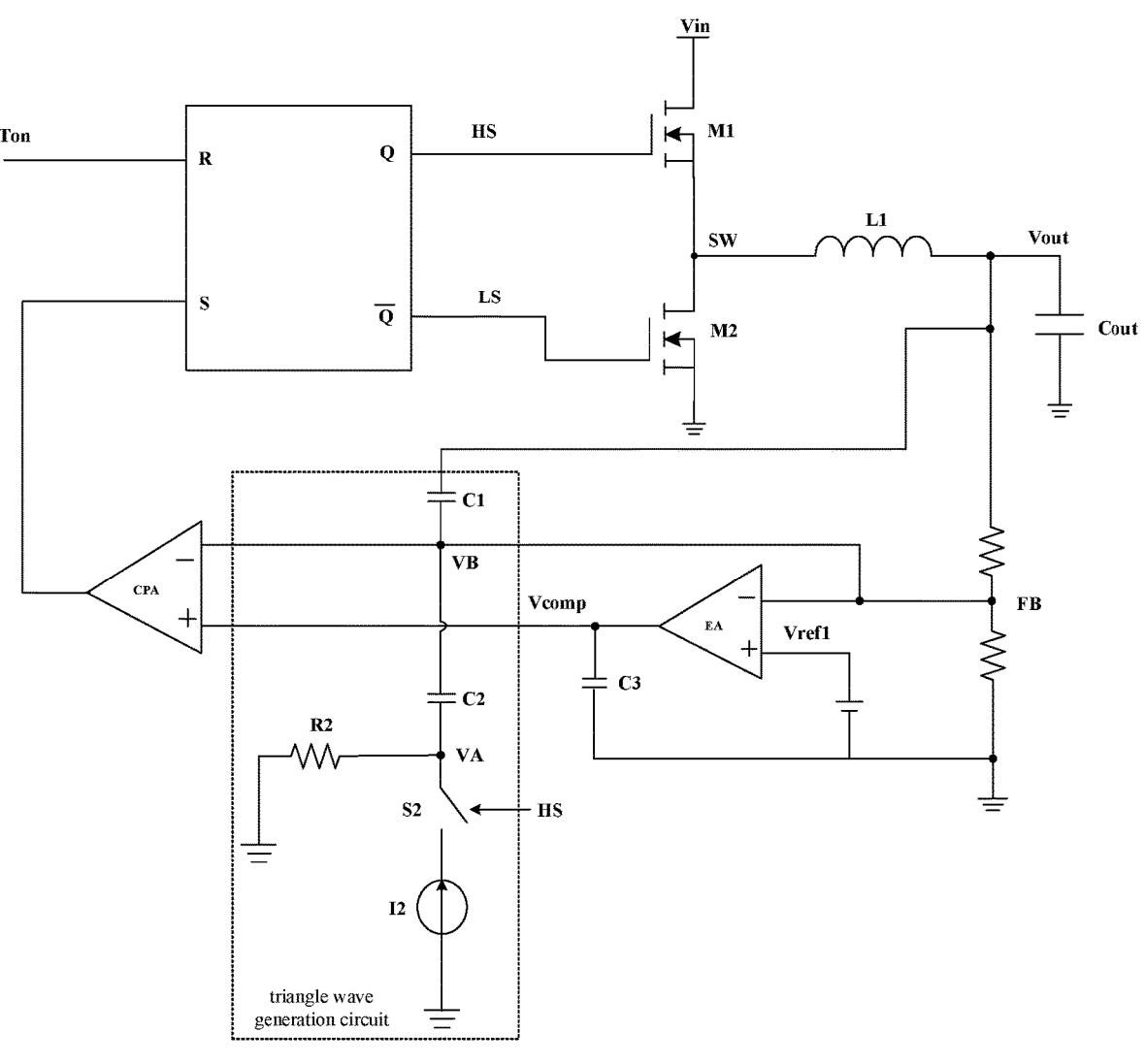
FIG. 6 is a circuit diagram of the third embodiment of the triangle waveform generation circuit according to the present invention.
Figure 7:
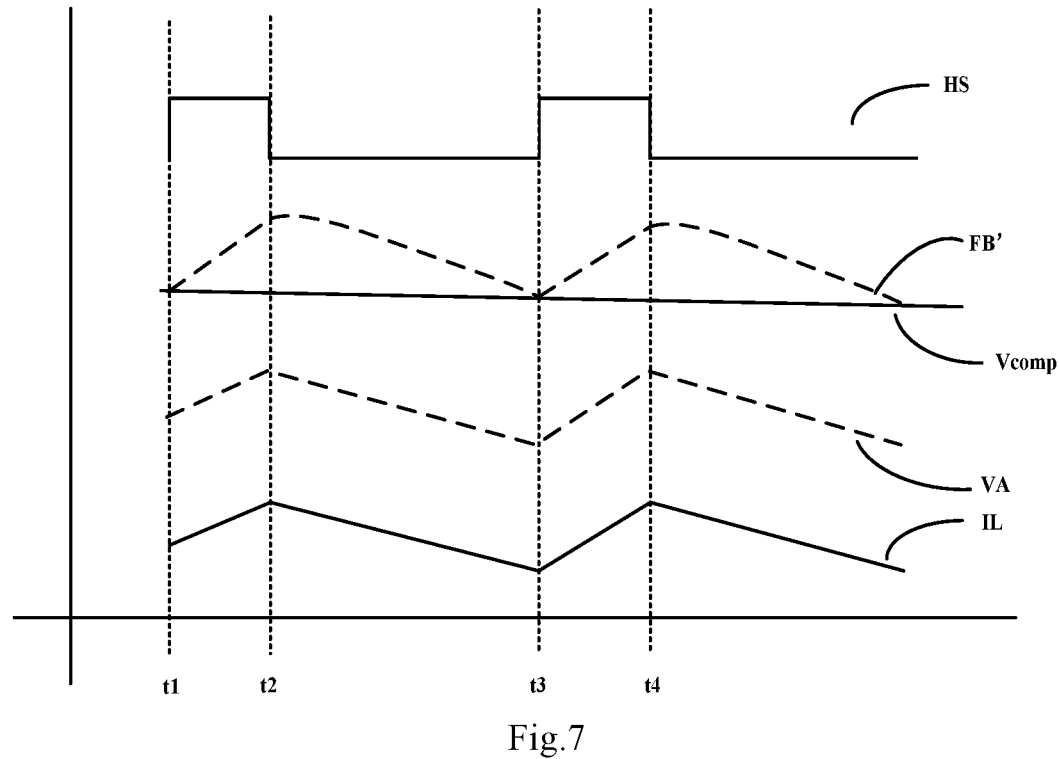
FIG. 7 is a working waveform of the third embodiment according to the present invention.

Refer to FIG. 6, it is a circuit diagram of the third embodiment according to the triangle wave generation circuit of the present invention, and FIG. 7 is a working waveform according to the third embodiment of the present invention. In this embodiment, the triangle wave signal is superimposed with the feedback signal of the output voltage feedback signal through the capacitor circuit to obtain the first compensation signal FB', and compares the error compensation signal and the first compensation signal to obtain the turning-on and -off signal to control the main power transistor to turn on. In this embodiment, the charging and discharging circuit comprises a second resistor R2, a second switching S2, and a second current source I2; here, the first terminal of the second capacitor C2 is connected to the signal terminal of the output voltage feedback signal, and the second terminal is connected to the charting and discharging circuit; the terminal of the first capacitor is connected to the output terminal of the switch power supply, and the second terminal is connected to the second terminal of the second capacitor; the first terminal of the second resistor R2 is connected to the ground, and the second terminal is connected to the second terminal of the first capacitor C1; The first switch and the current source are connected in series; one terminal of the series branch is connected to the second terminal of the first capacitor, and the other terminal is connected to the fixed potential terminal, wherein the first switch controls the turning-on and -off of the main power transistor according to the switch signal information; the first current source flows to the second terminal of the second capacitor C2. The switch state of the second switch S2 is consistent with the switch state of the main power transistor.

By combining the waveform shown in FIG. 7, when the main power transistor is turned on, the second switch is turned on, and after the stable-state work, the current flowing to the capacitor is I242*D=I2*(1−D), According to the capacitor characteristics, there is C*(du/dt)=I2*(1−D), For the inductor current, L*di/dt=Vin-Vout=Vin*(1−D), Here, a ratio of the change rate of the capacitor voltage and inductor current is L*I2/(Vin*C), When the main power transistor is turned off and the second switch is turned off, the current flowing to the capacitor is $-I2*D$, and the capacitor voltage is $C*(du/dt)$ $=-I2*D$, The inductor current is $L*di/dt=-Vout=-Vin*D$, Here a ratio of the change rate of the capacitor voltage and the inductor current is $L*I2/(Vin*C)$.

In this example, the change trend of the triangle wave signal is the same as that of the inductor current. When the first compensation signal achieves the compensation signal Vcomp, the main power transistor is turned on.

Embodiments of the present invention can also obtain the advantageous effects of good stability of the control loop and dynamic and fast response of the system. The present application superimposes the triangle wave signals into the control loop by the capacitor circuit, and the capacitor has the characteristics of DC communication. Therefore, it merely allows the AC signal denoting the inductor current information to pass, and isolates the DC signal voltage, which can greatly reduce signal interference, increases system accuracy and stability.

For the same reason, similar to the first embodiment, the current value of the second current source is proportional to the input voltage and/or output voltage of the switch power supply. In this way, the voltage of the point A will not be affected by the input voltage or the output voltage, and the output stability is good.

Figure 5:
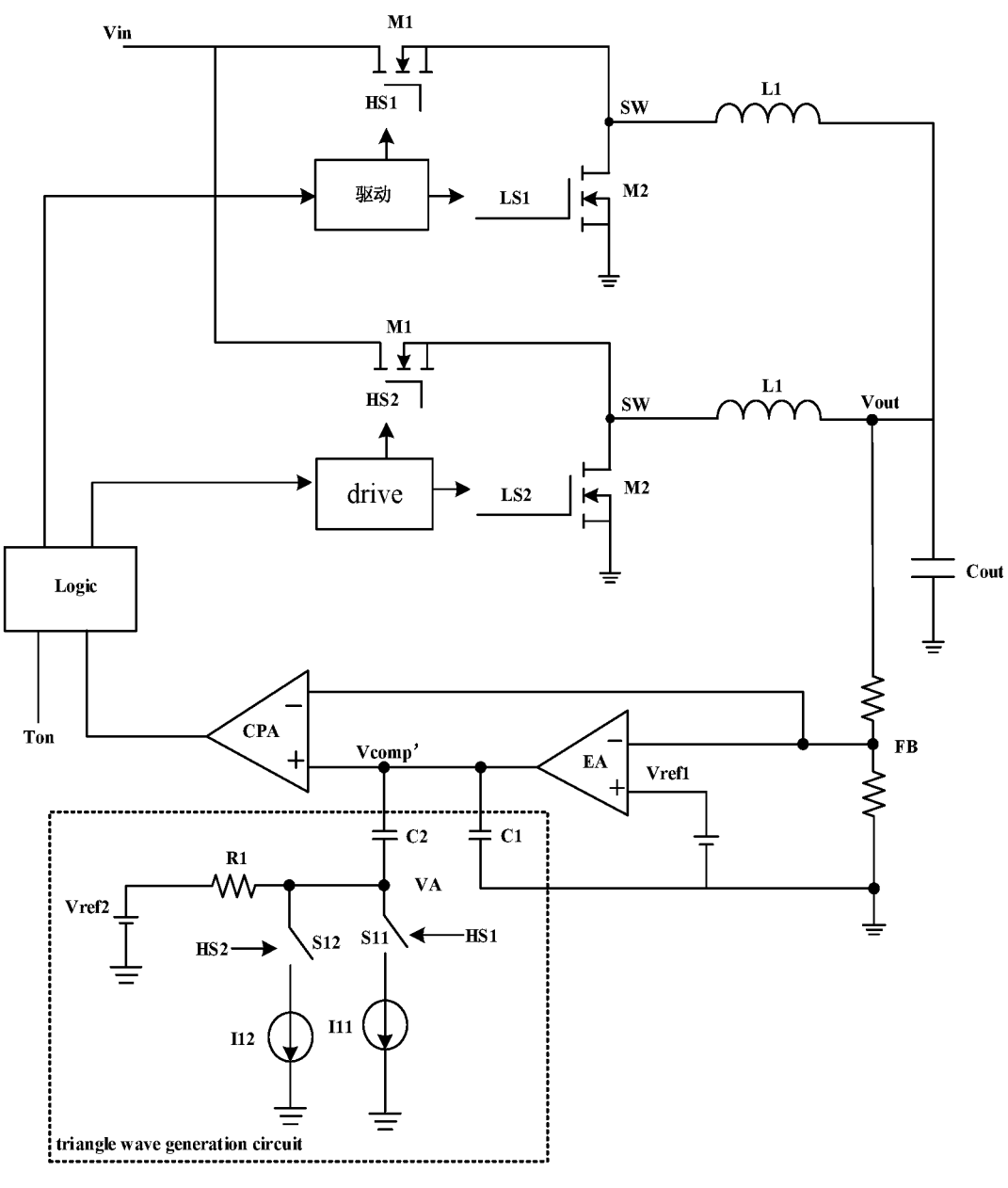
FIG. 5 is a circuit diagram of another switch power supply control circuit according to the present invention.

FIG. 5 is a circuit diagram of another switch power control circuit according to the present invention; in this embodiment, the main power transistor, the freewheeling transistor, and the inductor form the power stage circuit, and the switch power supply comprises a multi-phase power stage circuit. The triangular wave generation circuit obtains a triangular wave signal based on the switch signal information of the main power transistor in each phase of the multi-phase power-stage circuit, and the triangle wave signal represents the current information of the inductance in the power stage circuit in each phase. For the multi-phase switch power supply, since the power-stage circuit of each phase requires the information of the inductance current, the switch information of each main power transistor can be introduced in the charging and discharging circuit to obtain the inductive current in each phase power-stage circuit, so that each phase can get corresponding feedback control during the control process, and the loop stability is good, and response is fast. Such multi-phase control application is very convenient.

The embodiments described above do not constitute restriction of the protection of the technical solution. Any modification, equivalent replacement and improvement made within the spirits and principles of the above implementation method shall be included in the protection scope of the technical solution.

What is claimed is:

1. A fast-response switch power supply control circuit, for controlling a switch power supply comprising a main power transistor, a freewheeling transistor, and an inductor which are connected, wherein the switch power supply control circuit comprises:

an error compensation circuit, which obtains an error compensation signal according to an output voltage feedback signal and a reference signal, a triangle wave generation circuit, which obtains a triangular wave signal according to switch signal information of the main power transistor, the triangular wave signal representing current information of the inductor, wherein the triangular wave signal is superimposed with the output voltage feedback signal or the error compensation signal by a capacitor circuit to obtain a superimposed signal, a comparison circuit, which compares the error compensation signal with the superimposed signal of the triangular wave signal and the output voltage feedback signal, or compares the output voltage feedback signal with the superimposed signal of the triangular wave signal and the error compensation signal, a logic circuit, which is connected with an output terminal of the comparison circuit, so as to obtain a turning-on signal for controlling turning-on of the main power transistor according to a comparison result of the comparison circuit, wherein the capacitor circuit comprises a capacitor, which is connected between an input terminal of the comparison circuit and the triangular wave signal, the triangle wave generation circuit comprises a charging and discharge circuit and the capacitor circuit, a first terminal of the capacitor circuit is connected to an output voltage terminal of the switch power supply or a signal output terminal of the error compensation circuit, and a second terminal of the capacitor circuit is connected to the charging and discharging circuit, the charging and discharging circuit controls charging and discharging of the capacitor circuit according to the switch signal information of the main power transistor, the capacitor circuit further comprises a first capacitor connected to the capacitor, which serves as a second capacitor which are connected, a common node of the first capacitor and the second capacitor is connected to the output voltage terminal of the switch power supply or the signal output terminal of the error compensation signal, the triangular wave signal is superimposed with the output voltage feedback signal or the error compensation signal after being voltage-divided by the first capacitor and the second capacitor, the charging and discharging circuit comprises a first resistor, a first switch, and a first current source, a first terminal of the first capacitor is connected to an output terminal of the error amplifier, and a second terminal of the first capacitor is connected to a reference potential terminal which is grounded or providing a reference voltage potential; a first terminal of the second capacitor is connected to an output terminal of the error amplifier, and a second terminal of the second capacitor is connected to the charging and discharging circuit, a first terminal of the first resistor receives a first power supply voltage, and a second terminal of the first resistor is connected to the second terminal of the second capacitor, the first switch and the first current source are connected in series to form a series branch, one terminal of the series branch is connected to the second terminal of the second capacitor, and another terminal of the series branch is connected to a fixed potential terminal which is grounded or providing a fixed voltage potential, wherein the first switch controls turning-on and turning-off of the main power transistor according to the switch signal information, and current of the first current source flows to the fixed potential terminal.

2. The switch power supply control circuit of claim 1, wherein an absolute value of a slope of the triangular wave signal is proportional to an absolute value of a slope of current of the inductor.

3. The switch power supply control circuit of claim 1, wherein a voltage signal of the second terminal of the capacitor circuit is used as the triangular wave signal.

4. The switch power supply control circuit of claim 3, wherein the triangular wave signal performs a superposition operation on the error compensation signal to obtain a first compensation signal, and the comparison circuit compares the output voltage feedback signal with the first compensation signal.

5. The switch power supply control circuit of claim 4, wherein a change trend of the first compensation signal is opposite to that of current of the inductor.

6. The switch power supply control circuit of claim 4, wherein current value of the first current source is proportional to an input voltage and/or an output voltage of the switch power supply.

7. The switch power supply control circuit of claim 4, wherein the first capacitor is reused as a compensation capacitor in the error compensation circuit.

8. The switch power supply control circuit of claim 3, wherein the triangular wave signal performs a superposition operation on the output voltage feedback signal to obtain a first compensation signal, and the comparison circuit compares the error compensation signal with the first compensation signal, a change trend of the first compensation signal is same as that of current of the inductor.

9. The switch power supply control circuit of claim 1, wherein the switch power supply comprises a multi-phase power stage circuit, a power stage circuit at each phase of the multi-phase power stage circuit is constituted by the main power transistor, the freewheeling transistor, and the inductor, the triangular wave generation circuit obtains the triangular wave signal according to the switch signal information of the main power transistor of each phase in the multi-phase power stage circuit, and the triangular wave signal represents the current information of the inductor in the power stage circuit of each phase.

10. A fast-response switch power supply control method, for a switch power supply comprising a main power transistor, a freewheeling transistor, and an inductor which are connected, wherein the switch power supply control method comprises:

obtaining an error compensation signal according to an output voltage feedback signal and a reference signal;

obtaining a triangular wave signal according to switch signal information of the main power transistor, the triangular wave signal representing current information of the inductor, wherein the triangular wave signal is superimposed with the error compensation signal through a capacitor circuit to obtain a first compensation signal, comparing, by a comparison circuit, the output voltage feedback signal with the first compensation signal to obtain a turning-on signal for controlling turning-on of the main power transistor, wherein the capacitor circuit comprises a capacitor, which is connected between an input terminal of the comparison circuit and the triangular wave signal, an absolute value of a slope of the triangular wave signal is proportional to an absolute value of a slope of the current of the inductor.

11. A fast-response switch power supply control circuit, for controlling a switch power supply comprising a main power transistor, a freewheeling transistor, and an inductor which are connected, wherein the switch power supply control circuit comprises:

an error compensation circuit, which obtains an error compensation signal according to an output voltage feedback signal and a reference signal, a triangle wave generation circuit, which obtains a triangular wave signal according to switch signal information of the main power transistor, the triangular wave signal representing current information of the inductor, wherein the triangular wave signal is superimposed with the output voltage feedback signal or the error compensation signal by a capacitor circuit to obtain a superimposed signal, a comparison circuit, which compares the error compensation signal with the superimposed signal of the triangular wave signal and the output voltage feedback signal, or compares the output voltage feedback signal with the superimposed signal of the triangular wave signal and the error compensation signal, a logic circuit, which is connected with an output terminal of the comparison circuit, so as to obtain a turning-on signal for controlling turning-on of the main power transistor according to a comparison result of the comparison circuit, wherein the capacitor circuit comprises a capacitor, which is connected between an input terminal of the comparison circuit and the triangular wave signal, the triangle wave generation circuit comprises a charging and discharge circuit and the capacitor circuit, a first terminal of the capacitor circuit is connected to an output voltage terminal of the switch power supply or a signal output terminal of the error compensation circuit, and a second terminal of the capacitor circuit is connected to the charging and discharging circuit, the charging and discharging circuit controls charging and discharging of the capacitor circuit according to the switch signal information of the main power transistor, the capacitor circuit further comprises a first capacitor connected to the capacitor, which serves as a second capacitor which are connected, a common node of the first capacitor and the second capacitor is connected to the output voltage terminal of the switch power supply or the signal output terminal of the error compensation signal, the triangular wave signal is superimposed with the output voltage feedback signal or the error compensation signal after being voltage-divided by the first capacitor and the second capacitor, the triangular wave signal performs a superposition operation on the output voltage feedback signal to obtain a first compensation signal, and the comparison circuit compares the error compensation signal with the first compensation signal, a change trend of the first compensation signal is same as that of current of the inductor, the charging and discharging circuit comprises a second resistor, a second switch, and a second current source, a first terminal of the second capacitor is connected to a signal terminal of the output voltage feedback signal, a second terminal of the second capacitor is connected to the charging and discharging circuit; a first terminal of the first capacitor is connected to the output terminal of the switch power supply, and a second terminal of the first capacitor is connected to a second terminal of the second capacitor, the first terminal of the second resistor is connected to ground, and the second terminal is connected to the second terminal of the first capacitor, a first switch and a first current source are connected in series to form a series branch, one terminal of the series branch is connected to the second terminal of the first capacitor, and another terminal is connected to a fixed potential terminal which is grounded or providing a fixed voltage potential, wherein the first switch controls turning-on and turning-off of the main power transistor according to the switch signal information, and current of the first current source flows to the second terminal of the second capacitor.

12. The switch power supply control circuit of claim 11, wherein a current value of the second current source is proportional to an input voltage and/or an output voltage of the switch power supply.

13. The switch power supply control circuit of claim 11, wherein the control circuit is further configured to control turning-on time of the main power transistor, and output a turning-off signal to control the main power transistor to turn off.

* * * * *